United States Patent [19]
Kollinek

[11] Patent Number: 6,041,922
[45] Date of Patent: Mar. 28, 2000

[54] DVD CASE AND METHOD OF MANUFACTURING

[75] Inventor: Kurt Kollinek, Wayne, N.J.

[73] Assignee: Alpha Enterprises, N. Cartor, Ohio

[21] Appl. No.: 09/096,794

[22] Filed: Jun. 12, 1998

[51] Int. Cl.⁷ .................................................. B65D 85/57
[52] U.S. Cl. ........................................ 206/308.1; 206/310
[58] Field of Search ................................ 206/308.1, 309, 206/310, 493, 307

[56] References Cited

U.S. PATENT DOCUMENTS

| | | |
|---|---|---|
| 4,793,479 | 12/1988 | Otsuka et al. . |
| 4,819,799 | 4/1989 | Romula et al. . |
| 5,251,750 | 10/1993 | Gelardi et al. . |
| 5,353,932 | 10/1994 | Kollinek . |
| 5,626,225 | 5/1997 | Joyce, Jr. .............................. 206/308.1 |
| 5,727,680 | 3/1998 | Liu ........................................ 206/308.1 |
| 5,848,689 | 12/1998 | Mueller ................................. 206/308.1 |
| 5,887,713 | 3/1999 | Smith et al. .......................... 206/308.1 |

FOREIGN PATENT DOCUMENTS

| | | |
|---|---|---|
| 0 429 195 | 5/1991 | European Pat. Off. . |
| 3425579 | 1/1986 | Germany . |
| 205589 | 5/1990 | Japan . |

*Primary Examiner*—Jim Foster
*Attorney, Agent, or Firm*—Sard & Sebolt

[57] ABSTRACT

A plastic case suitable for housing a DVD disk manufactured by assembling a sandwich of heat-sealable members and heat-sealing them together to permanently seal the parts together. The manufacture utilizes vacuum forming of a rigid plastic sheets rather than injection molding to form the critical part of the case that functions to hold the disk on a center hub and that allows release of the disk by pushing down on the center hub. The center hub comprises three projections surrounding and each connected by a valley region to a center button-shaped member. Each projection at its outer edge comprises a detent region projecting above a recessed region beneath which functions to hold the disk in its mounted position above the level of the surrounding sheet surface. The recessed regions terminate below the disk in common, annular surface regions. The circle defined by the outer detent edges is slightly larger than the hole in the disk center such that when a disk is placed on top of the hub, it rests on the beveled edges on top of the hub. Pressing the disk downward causes the circle defined by the outer bevel edges to become slightly smaller than the disk hole which allows the disk to move downward until it rests on the hub. Pressing the hub center causes a one-way toggle action that releases the disk and allows it to be removed from the case.

14 Claims, 2 Drawing Sheets

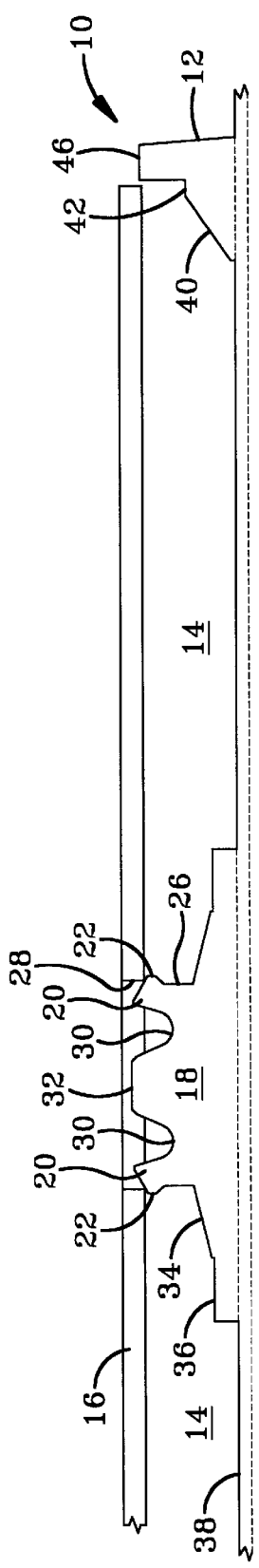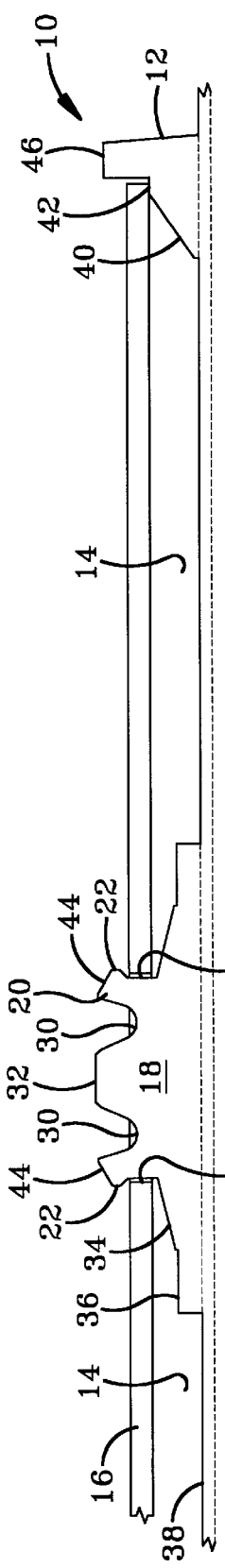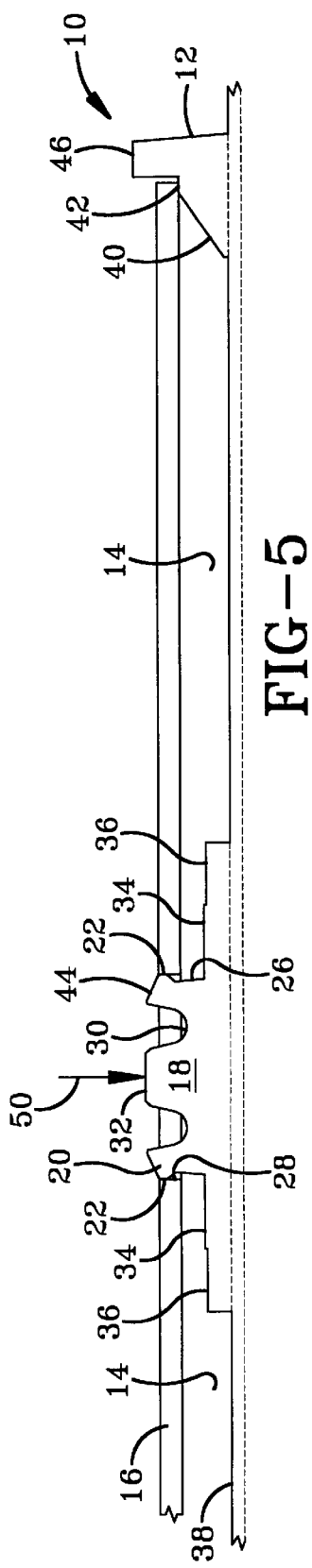

DVD CASE AND METHOD OF MANUFACTURING

This invention relates to a plastic package, in particular, a mostly plastic case designed to hold various planar objects with centering holes, such as, for example, a DVD disk.

BACKGROUND OF THE INVENTION

Plastic packages such as cases for CDs or DVD disks have been manufactured for several years. To the best of my knowledge, the commercial versions are manufactured by injection molding. The typical case comprises a center hub for receiving the disk hole on which can be mounted the disk by pressing the disk onto the hub. The so-called "jewel case" for CDs comprises a hub with radial slits which move radially inward under the disk pressure until the disk seats on the hub. The disk can be removed by lifting the disk outer edge until the disk lifts off of the hub. This construction is, however, considered unsatisfactory for DVD disks that contain much more information than the CD, and thus DVD suppliers require cases that use a push-button scheme to unmount the disk. In the cases currently available, again they are constructed by injection molding because of the need for accurate control of the dimensions of the center hub and the disk release mechanism.

One of my earlier U.S. Pat. No. 5,353,932 (the '932 patent), whose contents are herein incorporated by reference, describes and claims a process for making video cases for cassette tapes using vacuum forming techniques. A typical vacuum forming process consists of thermoforming a relatively rigid thermoplastic sheet, such as polyvinyl chloride (PVC), to form opposed inner contoured surfaces configured to receive and hold the video cassette or other object when the case is closed by folding about its spine, then covering the back side of the rigid sheet with, in turn, a cardboard stiffener, an opaque relatively flexible PVC sheet, and a clear relatively flexible PVC sheet, followed by heat-sealing together the sandwich so formed so as to seal the cardboard stiffener between the rigid PVC and the flexible opaque PVC sheets and the latter to each other and to the clear PVC sheet around three sides so that advertising material for the contents of the case can be inserted through the unsealed fourth side and thus be visible to prospective customers and users of the video cassette. Typically, for PVC, the relatively rigid sheet has a thickness between about 0.012 and 0.030 inches (in.), and the relatively flexible sheets have thicknesses ranging between about 0.003 and 0.020 in. The term "rigid" or "relatively rigid" is a term of art meaning a sheet thickness that will hold its shape when thermoformed, that is usually but not always thicker than the flexible sheet or relatively flexible sheets, but that still has sufficient flexibility to allow the case to bend easily around its spine and thus easily open and close. However, this degree of flexibility is insufficient to stiffen the case sides, which in use are not supposed to bend. Hence, it is common practice to insert a stiffener member in the case sides to stiffen the latter. Typically, the stiffener member is made of a non-heat-sealable material such as, for example, inexpensive cardboard about 0.018 to 0.120 in. thick, with score lines or slits defining a center spine to allow the flat sides of the stiffener member to bend around the score lines or slits when the case is closed.

It is desired to use the vacuum-forming scheme described in the '932 patent to manufacture a case for a DVD disk which utilizes a push-button scheme to unmount the disk. While most of the relevant prior art I am aware of uses injection molding schemes, I am also aware of two patents that do describe the use of vacuum forming for the manufacture of a CD or DVD disk. The first, U.S. Pat. No. 4,819,799, describes a central hub surrounded by a ledge on which the disk sits. Depressing the hub releases the disk. Few details on the construction of the hub which allows it to perform its functions are given in this patent, as the patent is mostly concerned with the sealing of the disk package from both sides. The second, Japanese Patent Disclosure No. 2-205589, published Aug. 15, 1990, discloses a center button surrounded by four spaced peripheral sections in turn surrounded by a ledge for supporting the disk when mounted. Each of the four peripheral sections have detent edges that hold the mounted disc, and which, when the center button is depressed, cause the detents to move inwardly allowing the disk to be removed. This Japanese document prefers to include a separate spring cushion between the ledge and a bottom plate which is sealed to the upper part to ensure an adequate restoring force when the center button is depressed. This construction with two sealed elements defining the case center and with the presence of the separate spring cushion undesirably increases the cost of manufacture. As described in the '932 patent, so-called turntable machines are employed in the sandwich assembly process, during which at stations situated around the turntable the case elements, including the thermoformed rigid member, the stiffener member, and the two flexible sheets, are assembled and at a final station the assembled sandwiched elements are heat-sealed together in a single step to complete the assembly. The case described in the Japanese document does not lend itself to manufacture by this process at acceptably high production rates.

SUMMARY OF THE INVENTION

An object of the invention is a plastic package construction and method of manufacture of cases for DVD disks and the like that utilizes vacuum forming of plastic sheets rather than injection molding to form the critical part of the case that functions to hold the disk on a center hub and that allows release of the disk by pushing down on the center hub.

In accordance with one aspect of the invention, the center hub made by vacuum forming of a single rigid sheet comprises three projections surrounding and each connected by a valley region to a center button-shaped member. Each projection at its outer edge comprises a detent region projecting above a recessed region beneath which functions to hold the disk in its mounted position above the level of the surrounding sheet surface. The recessed regions terminate below the disk in a first common, inner, upwardly-slanted annular surface region, which in turn terminates in a second common, outer, level annular surface region which then descends to the lowest level of the sheet which represents the case floor. Each of the projections are beveled or radiussed on top to allow for easy disk mounting. The circle defined by the outer bevel edges is slightly larger than the hole in the disk center such that when a disk is placed on top of the hub, it rests on the beveled edges on top of the hub. Pressing the disk downward causes the three projections to move and flex inward toward the hub center, slightly pivoting about the valley regions, such that the circle defined by the outer bevel edges becomes slightly smaller than the disk hole which allows the disk to move downward until it rests on the hub and on an annular surface region located in the case at the outer edge of the disk. Removing the downward pressure used to mount the disk allows the natural resilience of the rigid sheet to restore the projections to their original shape and position at which the disk hole is then gripped by the recessed regions below the projections supporting the disk above the other levels of the sheet.

To demount the disk, the user presses only the center button-shaped member. This action causes the following to occur. The first inner annular region is pushed down and becomes level. Since the disk is fixed, viewed vertically, by the annular surface region located in the case at the outer edge of the disk and the hub has elastically moved downward causing the projections to move and flex inward, the hub projections pass partially through the disk hole. If at this point the hub downward pressure is removed, then the hub released from the pressure moves upward to its original position and the disk is not released. However, if the downward pressure on the hub is increased, the first inner annular region now reverses direction and slants downward and the second annular region also moves and slants downward causing the projections to move further inward and causing the hub to pass entirely through the disk hole so that the disk now rests on top of the hub beveled edges. Releasing the hub will now cause the entire hub to move elastically upward to its original position raising the disk above the hub beveled edges allowing its easy removal from the case.

A characteristic feature of the invention is that the demounting of the disk is accompanied by a one-way toggle action of the hub assembly. When the hub is pushed down, with or without the disk being present, as the first inner annular region flexes from its slanted position in the up direction to its slanted position in the down direction and as the second outer annular region flexes from its level position to its downward slanting position, a snapping noise is heard as the inner and outer annular regions change direction. However, this lowest position of the hub is not stable, and when released it will, unaided, snap up to its original stable position. This is due to the restoring forces provided in the rigid plastic by both the flexed inner and outer annular regions. In other words, the hub when depressed toggles between a lower unstable position and an upper stable position. This is what is meant by a one-way toggle action. While the ordinary rigid plastic sheet normally has enough resilience to provide a restoring force when bent out of its normal position, I have found that this restoring force is enhanced not only by the configuration above described, but also as a result of the vacuum forming process, which tends to increase slightly the hardness of the sheet. The resultant restoring force of the vacuum formed sheet is sufficient by itself, without the need to supply additional spring or cushion members, to always restore the center hub to its normally up stable position lifting up the disk above the hub for easy removal even after repeated hub depressions. Avoiding the need to supply additional spring members considerably reduces the cost of manufacture by eliminating extra parts and steps and thus increasing the production rate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

FIG. 1 is a partial side view of one form of DVD case in accordance with the invention shown with a disk resting on top of the center hub;

FIG. 4 is a partial side view of the DVD case of FIG. 1 shown with a disk mounted on the center hub;

FIG. 5 is a partial side view showing an intermediate step during depression of the hub for releasing the disk;

FIGS. 1 and 4–6 are views actually taken along the line 6—6 in FIG. 2, so that two of the three projections will appear present.

DETAILED DESCRIPTION OF THE PREFERRED EMBODIMENTS

Figure 3:
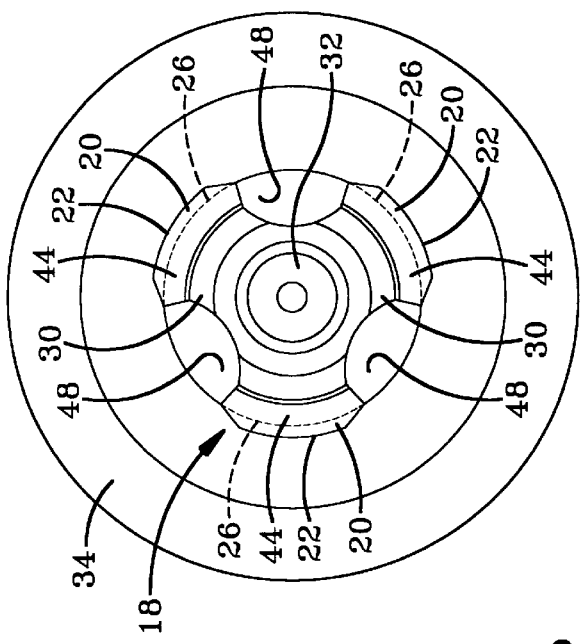
FIG. 3 is an enlarged top view of the hub part of the case shown in FIG. 2.

One form of the case of the invention is made in the same manner as is described in the '932 patent, namely, thermoforming a rigid PVC sheet to the desired configuration, then covering the back side of the rigid sheet with, in turn, a cardboard stiffener, an opaque relatively flexible PVC sheet, and a clear relatively flexible PVC sheet, followed by heat-sealing together the sandwich so formed in a single step so as to seal the cardboard stiffener between the rigid PVC and the flexible opaque PVC sheets. The major difference between the video cassette case of the '932 patent and the DVD case of the present invention is the construction and configuration of the disk mounting structure in the thermoformed rigid sheet. FIGS. 1–6 are views of just the inside surface of the rigid thermoformed sheet, i.e., the disk-holding side 10 of the case. The structure comprises a sheet 12 of rigid plastic vacuum formed to provide a center well or recess 14 for receiving the mounted disk 16 and the center hub structure 18 of the invention. The sheet 12 can have the thickness dimensions indicated above. Since the disk-holding side 10 of the case is symmetrical about the center hub 18, only one side, the right side 10, of the case is fully shown, as the opposite side is identical. Also not shown is the opposite case side and the intervening spine about which the opposite side can be folded to enclose the mounted disk. The underlying stiffener member 18 is shown in dashed lines and the flexible plastic cover to which the rigid sheet is sealed around its periphery is also not shown.

As illustrated in the drawings, the center hub 18 comprises three equal annularly-spaced projections 20 (two of which are shown in FIGS. 1 and 4–6) each having an outer-extending edge forming a detent region 22 which extends above and outwardly from an underlying recessed region 26 which is circular and which grips the inner edge of the disk hole 28 when the disk is seated on the hub. Each of the three projections 20 are integral with and spaced by valley regions 30 from a common center button 32. The three projections 20 are integral with and rise from a common circular annular region (referred to as the first inner annular region) 34 which in turn is integral with an adjacent common circular annular region (referred to as the second outer annular region) 36. The latter then drops down to the floor 38 of the well 14. At the outer edge of the well 14 a surface 40 slopes upward to a small ledge 42 which is approximately at the same level as the recessed region 26 which grips the mounted disk 16.

FIG. 1 shows the rest position of the center hub 18 when a disk 16 is just placed on top of the hub, before pressing down on the disk. As will be observed, the circle formed by the outer detent regions 22 has a slightly larger diameter than the disk hole 42, with the result that the disk rests on top of beveled or radiussed regions 44 at the outer edge of the detents. Now pressing down on the disk near its center hole 42 will cause the projections 20 to move elastically inward, shrinking the diameter of the circle formed by the outer detent regions 22 with the result that the disk hole 42 will pass over the detents 22 and the disk 16 will reach the recessed regions 26 below and will be stopped by the inner annular region 34 and the outer ledge 42. This is shown in FIG. 4. The disk hole 42 in FIG. 4 is shown slightly larger than the diameter of the recessed region 26, but in actual practice they would have roughly the same dimension subject to normal tolerances and will be in a light interference contact. When the pressure on the disk to seat the disk is removed, the elasticity of the formed rigid plastic will restore the hub to its original position and the hub will then grip the disk by its center hole. The disk position shown in FIG. 4 is termed the mounted position of the disk. As will also be noted, the disk 16 is stored in the well 14 below the level of the top surface 46 of the case and of the button 32 and cannot be removed from the hub because of the overhanging detents 22. Also note that the bottom side of the disk, its information storing side, is spaced above the well floor 14 and annular regions 34, 36 and thus its information will not be damaged by storage in the case.

Figure 2:
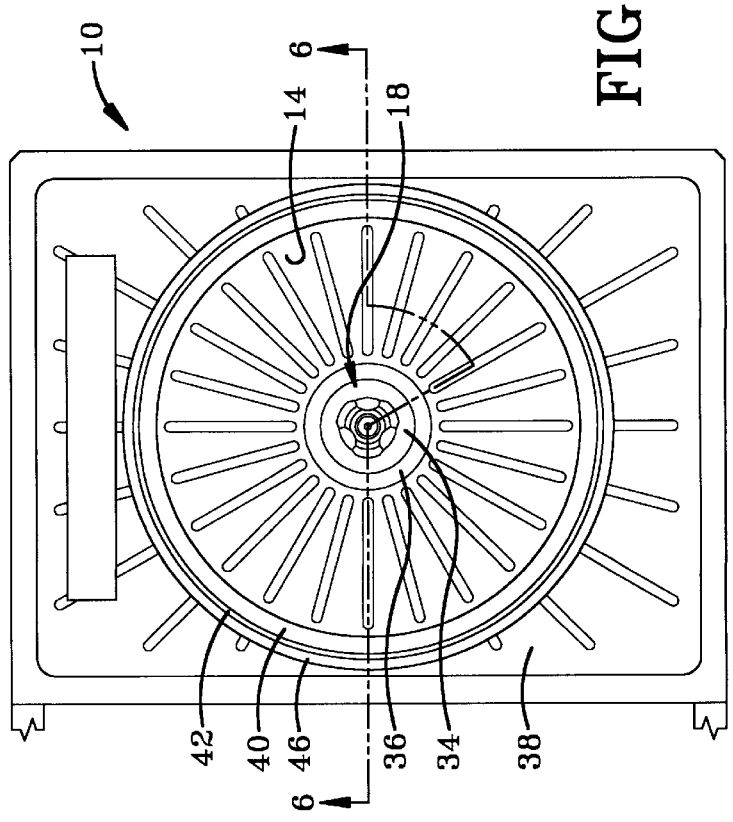
FIG. 2 is a top view of one side of the case containing the disk-holding hub but shown without the disk.

In FIG. 2, the radial pattern shown at the case floor is mainly cosmetics.

In FIG. 3, an enlarged top view of the hub 18, it will be clear that a radial center line through each of the detent regions 12 is circumferentially spaced 120° from the adjacent two detent regions. The region between, referenced 48, is a recessed area. Each of the detent regions extend over an arc of about 35°. FIG. 3 is drawn to scale of the actual preferred configuration. The recessed areas 48 extend over an arc also of about 35°.

Figure 6:
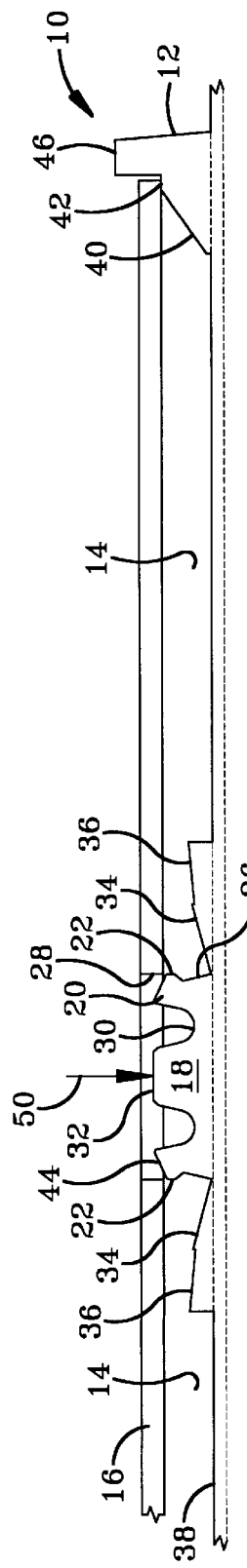
FIG. 6 is a partial side view showing the final step during depression of the hub when the disk is released from the hub.

Removal of the disk 16 is a two step process. To demount the disk, the user presses only the center button-shaped member, shown by the downward-facing arrow 50 in FIG. 5. This action causes the following to occur. The first inner annular region 34 is pushed down and becomes level. Since the disk 16 is fixed, viewed vertically in FIG. 5, by the annular surface region 42 located in the case at the outer edge of the disk and the hub has elastically moved downward causing the projections 22 to flex inward, the leveling of the inner annular region 34 inherently requires a reduction in the diameter of the circular line defining the outer edge of the detents 22 with the result that the hub projections 20 pass partially through the disk hole 42. If at this point the hub downward pressure 50 is removed, then the hub 18 released from the pressure moves upward to its original position and the disk is not released. However, if the downward pressure on the hub is increased, as shown in FIG. 6, the first inner annular region 34 now elastically reverses direction and slants downward and the second annular region 36 also elastically flexes and slants downward causing the detents 22 to flex further inward and causing the hub 18 to pass entirely through the disk hole 42 so that the disk 16 now rests on top of the hub beveled edges 44. Releasing the hub 18 will now cause the entire hub to move elastically upward to its original position raising the disk above the hub detents 22 allowing the disk's easy removal from the case. This restores the position of the case and disk illustrated in FIG. 1.

As mentioned above, the demounting of the disk is accompanied by a one-way toggle action of the hub assembly, as the first inner annular region 34 moves from its slanted position in the up direction to its slanted position in the down direction and as the second outer annular region 36 moves from its level position to its downward slanting position. This toggle action is repeatable and will not cause damage to the case. This is due to the restoring forces provided in the rigid plastic by both the inner and outer annular regions, the inner region 34 pivoting about the circular line between it and the outer annular region 36, and the outer annular region 36 pivoting about the circular line between the outer annular region 36 and the case floor 38. In other words, the hub when depressed toggles between a lower unstable position and an upper stable position.

In a preferred embodiment, which is not to be considered limiting, for a PVC rigid sheet of 0.015 in. thickness, the radius from the center to the outer edge of the detent 22 was about 0.305 in., the radius from the center to the outer surface of the recessed region 26 was about 0.280 in., leaving a detent 22 overhang of about 0.025 in. The height of the outer ledge 42 above the case floor 38 was about 0.125 in.; the depth of the valleys 30 was about 0.093 in., the outer diameter of the inner annular region 34 was about 0.921 in. and that of the outer annular region 36 about 1.250 in. In the rest position of the hub 18, the inner annular region 34 sloped upward at an angle of about 20° and it sloped downward at about the same angle in the maximum downward position of the hub 18 shown in FIG. 6. In the latter position, the outer annular region 36 sloped downwardly about 5°. The circle formed by the detents 22 shrunk about 0.125 in. between the rest hub position and its lowermost position. As previously indicated, except for the stiffener 18, the whole configuration of FIG. 1 represented by the sheet 12 is a one-piece thermoformed sheet of rigid plastic. In my experience, the number of projections 20 shown, which is three in number, is important to achieve the results described herein.

While the invention has been described particularly in connection with its application to a case for storing a DVD disk, it will be understood that the invention is also applicable to any plastic package or case for holding other kinds of flat objects with a center hole.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A foldable DVD case comprising:
    a) case sections joined to form an integral body, one of said case sections on a first side defining a circular well having a bottom surface and with a generally-circular center hub extending upwardly from the bottom well surface for receiving a DVD disk having a center hole,
    b) said integral body comprising a vacuum formed sheet member of relatively rigid thermoplastic material forming said first case side,
    c) said center hub being an integral part of the vacuum formed sheet member and comprising three projections connected by valley regions to a button-shaped center, each of the three projections having along an outer edge an outwardly-extending detent region, said hub having a first stable up position wherein the detent regions define a circle whose diameter is slightly larger than the diameter of the disk hole, a first generally horizontal annular region being an integral part of the vacuum formed sheet member and surrounding the hub and connecting the hub to the well surface,
    d) said hub and first annular region being configured such that, when the hub is depressed to a down position, the three projections flex inward defining a circle whose diameter is the same as or less than that of the disk hole, the hub when in its down position being unstable, e) said hub and first annular region being configured such that the hub elastically toggles in a one-way toggle action between its up position when not depressed and its down position when depressed without the aid of external resilient members capable of supplying a restoring force on the hub and the region immediately below the first annular region and the hub being free of such resilient members.

2. A foldable DVD case as claimed in claim 1, wherein radial center lines of each of the detent regions are separated by about 120°.

3. A foldable DVD case as claimed in claim 2, wherein each of the detent regions extend over an arc of about 35°.

4. A foldable DVD case as claimed in claim 1, further comprising a second generally horizontal annular region connecting the first annular region to the well surface.

5. A foldable DVD case as claimed in claim 4, wherein the first annular region is configured to slant upwardly from its generally-horizontal position when the hub is in its up position, and the second annular region is configured to extend horizontally when the hub is in its up position.

6. A foldable DVD case comprising:
   a) case sections joined to form an integral body, one of said case sections on a first side defining a circular well having a bottom surface and with a generally-circular center hub extending upwardly from the bottom well surface for receiving a DVD disk having a center hole,
   b) said integral body comprising a vacuum formed sheet member of relatively rigid thermoplastic material and having a thickness between about 0.012–0.030 inches and forming said first case side and having an opposite second side, a non-resilient stiffener sheet-like member on the second side, and at least one relatively flexible sheet of thermoplastic material over the stiffener member and heat-sealed around a substantial part of its periphery to the periphery of the thermoformed member so as to enclose the stiffener member,
   c) said center hub being an integral part of the vacuum formed sheet member and comprising three projections connected by valley regions to a button-shaped center, each of the three projections having along an outer edge an outwardly-extending detent region, said hub having a first stable up position wherein the detent regions define a circle whose diameter is slightly larger than the diameter of the disk hole, first inner and second outer generally-horizontal annular regions being an integral part of the vacuum formed sheet member and surrounding the hub and connecting the hub to the well surface,
   d) said hub and first and second annular regions being configured such that, when the hub is depressed to a down position, the three projections move inward defining a circle whose diameter is the same as or less than that of the disk hole, the hub when in its down position being unstable,
   e) said hub and first and second annular regions being configured such that the hub elastically toggles in a one-way toggle action between its up position when not depressed and its down position when depressed without the aid of external resilient members capable of supplying a restoring force on the hub and the region immediately below the first annular region and the hub being free of such resilient members.

7. The case of claim 6, wherein the stiffener sheet-like member is constituted of a non-heat-sealable material and the vacuum formed sheet member and flexible sheet are both constituted of heat-sealable material.

8. The case of claim 6, wherein the valley regions are approximately 0.090–0.1 inches deep.

9. A method of manufacturing a plastic package comprising case sections joined to form an integral body, one of the case sections having on a first side a walled area defining a well for receiving an object such that the case sections can be closed with the object inside and a generally flat side on a second side opposite to the first side and a generally-circular center hub extending upwardly from the bottom well surface for receiving a DVD disk having a center hole,
   said center hub comprising three projections connected by valley regions to a button-shaped center, each of the three projections having along an outer edge an outwardly-extending detent region, said hub having a first stable up position wherein the detent regions define a circle whose diameter is slightly larger than the diameter of the disk hole, a first generally-horizontal annular region being part of the vacuum formed sheet member and surrounding the hub and connecting the hub to the well surface,
   said hub and first annular region being configured such that, when the hub is depressed to a down position, the three projections move inward defining a circle whose diameter is the same as or less that of the disk hole, the hub when in its down position being unstable,
   said hub and first annular region being configured such that the hub toggles in a one-way toggle action between its up position when not depressed and its down position when depressed without the aid of external resilient members capable of supplying a restoring force on the hub and the region immediately below the first annular region and the hub being free of such resilient members,
comprising the steps:
   a) thermoforming a sheet of relatively rigid heat-sealable thermoplastic material to form the first case side with the well and the hub,
   b) forming a non-resilient stiffener member of a sheet-like non-heat-sealable material and providing same on said thermoformed sheet on the second side,
   c) providing over the stiffener member at least one relatively flexible sheet of heat-sealable thermoplastic material,
   d) heat-sealing around its periphery the flexible sheet to the periphery of the thermoformed sheet so as to enclose the stiffener member.

10. A foldable DVD case comprising:
   a) case sections joined to form an integral body, one of said case sections on a first side defining a circular well having a bottom surface and with a generally-circular center hub extending upwardly from the bottom well surface for receiving a DVD disk having a center hole,
   b) said integral body comprising a vacuum formed sheet member of relatively rigid thermoplastic material forming said first case side,
   c) said center hub being an integral part of the vacuum formed sheet member and comprising three projections connected by valley regions to a button-shaped center, each of the three projections having along an outer edge an outwardly-extending detent region, said hub having a first stable up position wherein the detent regions define a circle whose diameter is slightly larger than the diameter of the disk hole, a first annular region being an integral part of the vacuum formed sheet member and surrounding the hub and connecting the hub to the well surface, a second annular region connecting the first annular region to the well surface, d) said hub and first and second annular region being configured such that, when the hub is depressed to a down position, the three projections flex inward defining a circle whose diameter is the same as or less than that of the disk hole, the hub when in its down position being unstable, e) said hub and first and second annular region being configured such that the hub elastically toggles between its up position when not depressed and its down position when depressed without the aid of external resilient members, f) the first annular region being configured to slant upwardly when the hub is in its up position, the second annular region being configured to extend horizontally when the hub is in its up position, the first annular region being configured to slant downwardly when the hub is depressed into its down position providing a restoring force, and the second annular region being configured to slant downwardly when the hub is depressed into its down position also providing a restoring force.

11. A foldable DVD case comprising:

a) case sections joined to form an integral body, one of said case sections on a first side defining a circular well having a bottom surface and with a generally-circular center hub extending upwardly from the bottom well surface for receiving a DVD disk having a center hole, b) said integral body comprising a vacuum formed sheet member of relatively rigid thermoplastic material and having a thickness between about 0.012–0.030 inches and forming said first case side and having an opposite second side, a stiffener sheet-like member on the second side, and at least one relatively flexible sheet of thermoplastic material over the stiffener member and heat-sealed around a substantial part of its periphery to the periphery of the thermoformed member so as to enclose the stiffener member, c) said center hub being an integral part of the vacuum formed sheet member and comprising three projections connected by valley regions to a button-shaped center, each of the three projections having along an outer edge an outwardly-extending detent region, said hub having a first stable up position wherein the detent regions define a circle whose diameter is slightly larger than the diameter of the disk hole, first and second annular regions being an integral part of the vacuum formed sheet member and surrounding the hub and connecting the hub to the well surface, d) said hub and first and second annular regions being configured such that, when the hub is depressed to a down position, the three projections move inward defining a circle whose diameter is the same as or less than that of the disk hole, the hub when in its down position being unstable, e) said hub and first and second annular regions being configured such that the hub elastically toggles between its up position when not depressed and its down position when depressed without the aid of external resilient members, f) the first annular region being configured to slant upwardly when the hub is in its up position, the second annular region being configured to extend horizontally when the hub is in its up position, the first annular region being configured to slant downwardly when the hub is depressed into its down position providing a restoring force, and the second annular region being configured to slant downwardly when the hub is depressed into its down position providing a restoring force.

12. The case of claim 11, wherein the first annular region when slanted upwardly or downwardly forms an angle of about 20°.

13. A foldable DVD case comprising:

a) case sections joined to form an integral body, one of said case sections on a first side defining a circular well having a bottom surface and with a generally-circular center hub extending upwardly from the bottom well surface for receiving a DVD disk having a center hole, b) said integral body comprising a vacuum formed sheet member of relatively rigid thermoplastic material and having a thickness between about 0.012–0.030 inches and forming said first case side and having an opposite second side, a stiffener sheet-like member on the second side, and at least one relatively flexible sheet of thermoplastic material over the stiffener member and heat-sealed around a substantial part of its periphery to the periphery of the thermoformed member so as to enclose the stiffener member, c) said center hub being an integral part of the vacuum formed sheet member and comprising three projections connected by valley regions to a button-shaped center, each of the three projections having along an outer edge an outwardly-extending detent region, said hub having a first stable up position wherein the detent regions define a circle whose diameter is slightly larger than the diameter of the disk hole, first and second annular regions being an integral part of the vacuum formed sheet member and surrounding the hub and connecting the hub to the well surface, d) said hub and first and second annular regions being configured such that, when the hub is depressed to a down position, the three projections move inward defining a circle whose diameter is the same as or less than that of the disk hole, the hub when in its down position being unstable, e) said hub and first and second annular regions being configured such that the hub elastically toggles between its up position when not depressed and its down position when depressed without the aid of external resilient members.

f) the stiffener sheet-like member being constituted of a non-heat-sealable cardboard and the vacuum formed sheet member and flexible sheet being both constituted of heat-sealable PVC.

14. A foldable DVD case as claimed in claim 4, wherein both the first annular region and the second annular region are configured to slant downwardly from their generally-horizontal positions when the hub is depressed into its down position providing a restoring force on the hub.

* * * * *